(12) United States Patent
Zhang et al.

(10) Patent No.: US 9,942,073 B2
(45) Date of Patent: Apr. 10, 2018

(54) INFORMATION TRANSMISSION METHOD, APPARATUS, AND DEVICE

(71) Applicant: HUAWEI TECHNOLOGIES CO., LTD., Shenzhen (CN)

(72) Inventors: Junping Zhang, Shenzhen (CN); Min Yan, Shenzhen (CN); Wei Wang, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 15/250,395

(22) Filed: Aug. 29, 2016

(65) Prior Publication Data

US 2016/0373284 A1 Dec. 22, 2016

Related U.S. Application Data

(63) Continuation of application No. PCT/CN2014/072888, filed on Mar. 5, 2014.

(51) Int. Cl.
*H04L 27/26* (2006.01)
*H04L 27/18* (2006.01)

(52) U.S. Cl.
CPC ........ *H04L 27/2627* (2013.01); *H04L 27/183* (2013.01); *H04L 27/2602* (2013.01); *H04L 27/2626* (2013.01); *H04L 27/2657* (2013.01); *H04L 27/2675* (2013.01)

(58) Field of Classification Search
None
See application file for complete search history.

(56) References Cited

U.S. PATENT DOCUMENTS

| 8,170,130 | B2 | 5/2012 | Nakahara et al. |
| 2002/0021715 | A1* | 2/2002 | Matheus ............. H04L 27/2657 370/480 |
| 2007/0147479 | A1* | 6/2007 | Yamasuge ............. H04B 1/713 375/131 |
| 2008/0212706 | A1 | 9/2008 | Nakahara et al. |

(Continued)

FOREIGN PATENT DOCUMENTS

| CN | 101160748 A | 4/2008 |
| CN | 103326838 A | 9/2013 |

OTHER PUBLICATIONS

Asaf Cidon et al., "Flashback: Decoupled Lightweight Wireless Control," SIGCOMM' 12. Aug. 13-17, 2012, Helsinki, Finland, pp. 223-234 (12 pages).

(Continued)

*Primary Examiner* — Kouroush Mohebbi
(74) *Attorney, Agent, or Firm* — Huawei Technologies Co., Ltd.

(57) ABSTRACT

A method, an apparatus, and a device are provided for information transmission. In the method, the apparatus determines an initial OFDM symbol in OFDM symbols used to transmit load information. The apparatus determines, starting from the initial OFDM symbol, a phase deviation difference between two adjacent OFDM symbols according to first information to be transmitted. The apparatus performs phase deviation on at least one of the OFDM symbols according to the phase deviation difference. The apparatus then sends the OFDM symbols obtained after the phase deviation to a receiving end.

15 Claims, 6 Drawing Sheets

(56) References Cited

U.S. PATENT DOCUMENTS

2008/0262775 A1* 10/2008 Mikkonen ............ H04L 5/0048
702/106
2013/0010725 A1 1/2013 Wu et al.

OTHER PUBLICATIONS

Jiansong Zhang et al., "Frame Retransmissions Considered Harmful: Improving Spectrum Efficiency Using Micro-ACKs," MobiCom' 12. Aug. 22-26, 2012, Istanbul, Turkey, 12 pages.
International Search Report (including English translation) issued in corresponding International Application No. PCT/CN2014/072888, dated Jul. 30, 2014, 8 pages.

* cited by examiner

INFORMATION TRANSMISSION METHOD, APPARATUS, AND DEVICE

CROSS REFERENCE TO RELATED APPLICATION

This application is a continuation of International Patent Application No. PCT/CN2014/072888, filed on Mar. 5, 2014, which is hereby incorporated by reference in its entirety.

TECHNICAL FIELD

The present disclosure relates to the communications field, and in particular, to an information transmission method and apparatus and a device.

BACKGROUND

At present, in a wireless network based on orthogonal frequency division multiplexing (OFDM), load information is transmitted by using OFDM symbols. For example, in the 802.11a protocol standard, 12 OFDM symbols sent in the beginning are used as a preamble signal, and OFDM symbols following the 12 OFDM symbols are used to transmit load information. The load information is generally a data part of a physical layer, and may include a protocol unit, a data unit, and the like at a media access control (MAC) layer and an upper layer.

However, according to such a method in which load information is transmitted by using OFDM symbols, only the load information can be transmitted by using the OFDM symbols, and other information except the load information cannot be transmitted at the same time when the load information is being transmitted. Consequently, information transmission efficiency and transmission resource utilization are low.

SUMMARY

Embodiments of the present disclosure provide an information transmission method and apparatus and a device.

According to a first aspect, a method is provided for transmitting information. In the method, the transmitting end determines an initial OFDM symbol in OFDM symbols that transmit load information. The transmitting end determines, starting from the initial OFDM symbol, a phase deviation difference between two adjacent OFDM symbols according to first information to be transmitted. The transmitting end performs phase deviation on at least one of the OFDM symbols according to the phase deviation difference and sends the OFDM symbols obtained after the phase deviation to a receiving end.

According to a second aspect, a method is provided. In the method, a receiving end receives OFDM symbols that transmit load information; determining an initial OFDM symbol in the received OFDM symbols. The receiving end determines, starting from the initial OFDM symbol, a phase deviation difference between two adjacent OFDM symbols. The receiving end determines first information according to the phase deviation difference.

According to a third aspect, an apparatus is provided for information transmission. The apparatus including: a first determining unit, configured to determine an initial OFDM symbol in OFDM symbols used to transmit load information; a second determining unit, configured to determine, starting from the initial OFDM symbol determined by the first determining unit, a phase deviation difference between two adjacent OFDM symbols according to first information to be transmitted; a processing unit, configured to perform phase deviation on each OFDM symbol according to the phase deviation difference determined by the second determining unit; and a sending unit, configured to send, to a receiving end, the OFDM symbols obtained after the phase deviation performed by the processing unit.

According to a fourth aspect, an apparatus is provided for information transmission. The apparatus includes: a receiving unit, configured to receive OFDM symbols used to transmit load information; a third determining unit, configured to determine an initial OFDM symbol in the OFDM symbols received by the receiving unit; a fourth determining unit, configured to determine, starting from the initial OFDM symbol determined by the third determining unit, a phase deviation difference between two adjacent OFDM symbols; and a fifth determining unit, configured to determine first information according to the phase deviation difference determined by the fourth determining unit.

According to a fifth aspect, a transmitting end is provided. The transmitting end includes a processor and a transceiver. The processor is configured to:

determine an initial OFDM symbol in OFDM symbols used to transmit load information; determine, starting from the initial OFDM symbol, a phase deviation difference between two adjacent OFDM symbols according to first information to be transmitted; and perform phase deviation on each OFDM symbol according to the phase deviation difference. The transceiver is configured to send, to a receiving end, the OFDM symbols obtained after the phase deviation performed by the processor.

According to a sixth aspect, a receiving end is provided. The receiving end includes a transceiver and a processor. The transceiver is configured to receive OFDM symbols used to transmit load information. The processor is configured to: determine an initial OFDM symbol in the OFDM symbols received by the transceiver; determine, starting from the initial OFDM symbol, a phase deviation difference between two adjacent OFDM symbols; and determine first information according to the phase deviation difference.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
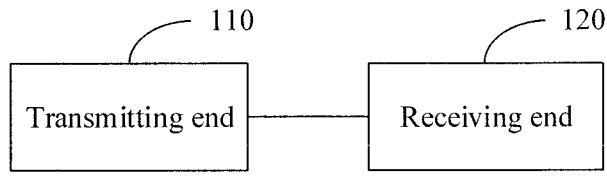
FIG. 1 is an exemplary diagram of an application scenario according to an embodiment of the present disclosure.

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

With reference to the first aspect, in a first possible implementation manner of the first aspect, the first information is M-ary information, M is a natural number greater than 1, each bit of the first information corresponds to two different adjacent OFDM symbols, and a different value of each bit of the first information corresponds to a different reference difference; and the determining a phase deviation difference between two adjacent OFDM symbols according to first information to be transmitted includes: for each bit of the first information, determining, according to a value of the bit, a reference difference corresponding to the value as a phase deviation difference between two adjacent OFDM symbols that is corresponding to the bit.

With reference to the first possible implementation manner of the first aspect, in a second possible implementation manner of the first aspect, a value of M is one of the following numbers: 2, 4, 8, 16, and 32.

With reference to the first aspect, and/or the first possible implementation manner of the first aspect, and/or the second possible implementation manner of the first aspect, in a third possible implementation manner of the first aspect, the performing phase deviation on each OFDM symbol according to the phase deviation difference includes: obtaining an initial phase deviation value of the initial OFDM symbol; sequentially determining, starting from the initial OFDM symbol, a phase deviation value of each OFDM symbol according to the initial phase deviation value and the phase deviation difference between two adjacent OFDM symbols; and performing, according to the determined phase deviation value of each OFDM symbol, phase deviation on the OFDM symbol.

With reference to the second aspect, in a first possible implementation manner of the second aspect, the determining a phase deviation difference between two adjacent OFDM symbols includes: determining, starting from the initial OFDM symbol, a phase deviation value of each OFDM symbol; and calculating the phase deviation difference between two adjacent OFDM symbols.

With reference to the second aspect, and/or the first possible implementation manner of the second aspect, in a second possible implementation manner of the second aspect, the first information is M-ary information, M is a natural number greater than 1, each bit of the first information corresponds to two different adjacent OFDM symbols, and a different value of each bit of the first information corresponds to a different reference difference; and the determining first information according to the phase deviation difference includes: for a phase deviation difference between each two adjacent OFDM symbols, determining, according to a value relationship between the phase deviation difference and the reference difference, a value of a bit that is of the first information and corresponding to the phase deviation difference between two adjacent OFDM symbols.

With reference to the third aspect, in a first possible implementation manner of the third aspect, the first information is M-ary information, M is a natural number greater than 1, each bit of the first information corresponds to two different adjacent OFDM symbols, and a different value of each bit of the first information corresponds to a different reference difference; and the first determining unit is specifically configured to: for each bit of the first information, determine, according to a value of the bit, a reference difference corresponding to the value as a phase deviation difference between two adjacent OFDM symbols that is corresponding to the bit.

With reference to the first possible implementation manner of the third aspect, in a second possible implementation manner of the third aspect, a value of M is one of the following numbers: 2, 4, 8, 16, and 32.

With reference to the third aspect, and/or the first possible implementation manner of the third aspect, and/or the second possible implementation manner of the third aspect, in a third possible implementation manner of the third aspect, the processing unit includes: an obtaining subunit, configured to obtain an initial phase deviation value of the initial OFDM symbol; a first determining subunit, configured to sequentially determine, starting from the initial OFDM symbol, a phase deviation value of each OFDM symbol according to the initial phase deviation value and the phase deviation difference between two adjacent OFDM symbols; and a processing subunit, configured to perform, according to the determined phase deviation value of each OFDM symbol, phase deviation on the OFDM symbol.

With reference to the fourth aspect, in a first possible implementation manner of the fourth aspect, the fourth determining unit includes: a second determining subunit, configured to determine, starting from the initial OFDM symbol, a phase deviation value of each OFDM symbol; and a calculating subunit, configured to calculate the phase deviation difference between two adjacent OFDM symbols.

With reference to the fourth aspect, and/or the first possible implementation manner of the fourth aspect, in a second possible implementation manner of the fourth aspect, the first information is M-ary information, M is a natural number greater than 1, each bit of the first information corresponds to two different adjacent OFDM symbols, and a different value of each bit of the first information corresponds to a different reference difference; and the fifth determining unit is specifically configured to: for a phase deviation difference between each two adjacent OFDM symbols, determine, according to a value relationship between the phase deviation difference and the reference difference, a value of a bit that is of the first information and corresponding to the phase deviation difference between two adjacent OFDM symbols.

With reference to the fifth aspect, in a first possible implementation manner of the fifth aspect, the first information is M-ary information, M is a natural number greater than 1, each bit of the first information corresponds to two different adjacent OFDM symbols, and a different value of each bit of the first information corresponds to a different reference difference; and the processor is specifically configured to: for each bit of the first information, determine, according to a value of the bit, a reference difference corresponding to the value as a phase deviation difference between two adjacent OFDM symbols that is corresponding to the bit.

With reference to the first possible implementation manner of the fifth aspect, in a second possible implementation manner of the fifth aspect, a value of M is: 2, 4, 8, 16, or 32.

With reference to the fifth aspect, and/or the first possible implementation manner of the fifth aspect, and/or the second possible implementation manner of the fifth aspect, in a third possible implementation manner of the fifth aspect, the processor is specifically configured to: obtain an initial phase deviation value of the initial OFDM symbol; sequentially determine, starting from the initial OFDM symbol, a phase deviation value of each OFDM symbol according to the initial phase deviation value and the phase deviation difference between two adjacent OFDM symbols; and perform, according to the determined phase deviation value of each OFDM symbol, phase deviation on the OFDM symbol.

With reference to the sixth aspect, in a first possible implementation manner of the sixth aspect, the processor is specifically configured to: determine, starting from the initial OFDM symbol, a phase deviation value of each OFDM symbol; and calculate the phase deviation difference between two adjacent OFDM symbols.

With reference to the sixth aspect, and/or the first possible implementation manner of the sixth aspect, in a second possible implementation manner of the sixth aspect, the first information is M-ary information, M is a natural number greater than 1, each bit of the first information corresponds to two different adjacent OFDM symbols, and a different value of each bit of the first information corresponds to a different reference difference; and the processor is specifically configured to: for a phase deviation difference between each two adjacent OFDM symbols, determine, according to a value relationship between the phase deviation difference and the reference difference, a value of a bit that is of the first information and corresponding to the phase deviation difference between two adjacent OFDM symbols.

In the embodiments of the present disclosure, a transmitting end determines an initial OFDM symbol in OFDM symbols used to transmit load information; determines, starting from the initial OFDM symbol, a phase deviation difference between two adjacent OFDM symbols according to first information to be transmitted; performs phase deviation on each OFDM symbol according to the phase deviation difference; and sends the OFDM symbols obtained after the phase deviation to a receiving end. Therefore, besides transmitting the load information by using the OFDM symbols, the transmitting end further transmits the first information according to the phase deviation difference between two adjacent OFDM symbols used to transmit the load information, so that the load information and the first information may be transmitted at the same time by using the OFDM symbols, thereby improving information transmission efficiency between the transmitting end and the receiving end, and improving transmission resource utilization between the transmitting end and the receiving end.

Embodiments of the present disclosure provide an information transmission method and apparatus and a device, where other information can be transmitted at the same time when load information is being transmitted by using OFDM symbols, so that information transmission efficiency and transmission resource utilization are improved.

Referring to FIG. 1, FIG. 1 is an application scenario example of an information transmission method and apparatus and a device according to the present disclosure. A transmitting end 110 and a receiving end 120 are included, and communication between the transmitting end 110 and the receiving end 120 may be performed by using OFDM symbols. Specifically, the transmitting end 110 may transmit load information to the receiving end 120 by using the OFDM symbols. In addition, in an embodiment of the present disclosure, the transmitting end 110 may further transmit first information to the receiving end 120 at the same time by using the OFDM symbols used to transmit the load information. The first information may be any information that the transmitting end 110 expects to transmit to the receiving end, and the first information may be relevant or irrelevant to the load information. In a possible implementation manner, first information may be control information relevant to load information transmitted at the same time with the first information by using OFDM symbols. In another possible implementation manner, first information may be other load information irrelevant to load information transmitted at the same time with the first information by using OFDM symbols.

The transmitting end and the receiving end may be devices that support an OFDM system, where the OFDM system may include but is not limited to IEEE 802.11a/n/ac. Specifically, for example, the transmitting end and the receiving end may be routers, mobile phones, notebook computer network adapters, or the like that support 802.11a/n, which are not limited herein.

Figure 2:
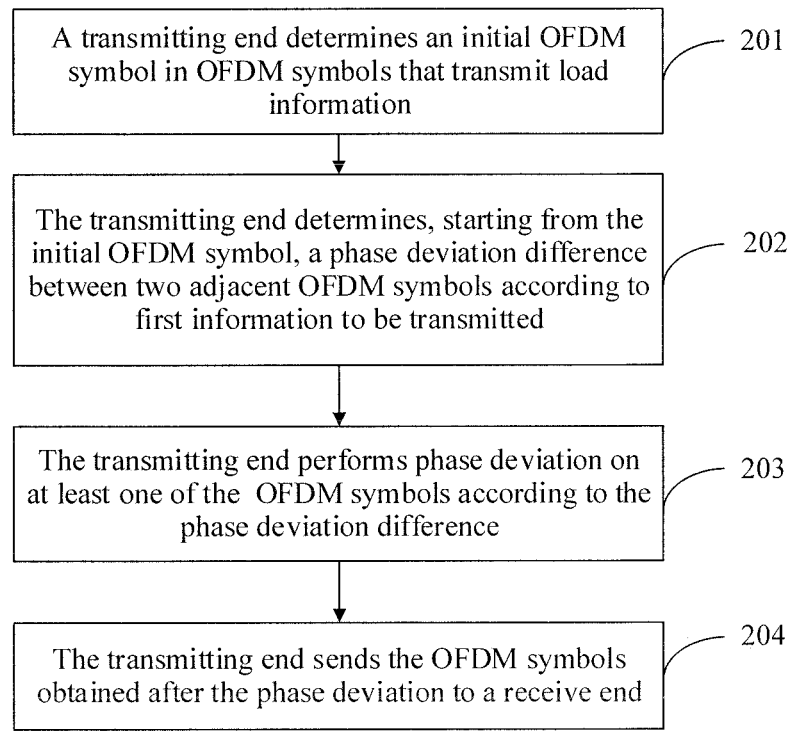
FIG. 2 is a flowchart of an information transmission method according to an embodiment of the present disclosure.

Referring to FIG. 2, FIG. 2 is a schematic flowchart of an information transmission method according to an embodiment of the present disclosure, and the method includes:

Step 201: A transmitting end determines an initial OFDM symbol in OFDM symbols used to transmit load information.

Step 202: The transmitting end determines, starting from the initial OFDM symbol, a phase deviation difference between two adjacent OFDM symbols according to first information to be transmitted.

Step 203: The transmitting end performs phase deviation on at least one of the OFDM symbols according to the phase deviation difference. For example, the transmitting end may perform phase deviation on each OFDM symbol according to the phase deviation difference.

Step 204: The transmitting end sends the OFDM symbols obtained after the phase deviation to a receiving end.

In this embodiment, besides transmitting load information by using OFDM symbols, a transmitting end further transmits first information according to a phase deviation difference between two adjacent OFDM symbols used to transmit the load information, so that the load information and the first information may be transmitted at the same time by using the OFDM symbols, thereby improving information transmission efficiency between the transmitting end and a receiving end, and improving transmission resource utilization between the transmitting end and the receiving end.

Figure 3:
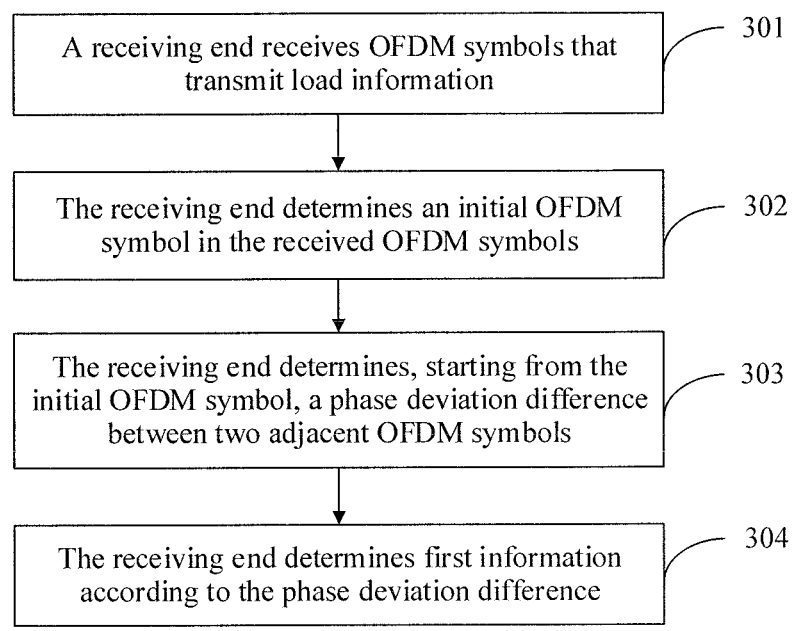
FIG. 3 is a flowchart of another information transmission method according to an embodiment of the present disclosure.

Referring to FIG. 3, FIG. 3 is a schematic flowchart of another information transmission method according to an embodiment of the present disclosure, and the method includes:

Step 301: A receiving end receives OFDM symbols used to transmit load information.

Step 302: The receiving end determines an initial OFDM symbol in the received OFDM symbols.

Step 303: The receiving end determines, starting from the initial OFDM symbol, a phase deviation difference between two adjacent OFDM symbols.

Step 304: The receiving end determines first information according to the phase deviation difference.

In this embodiment, after receiving OFDM symbols used to transmit load information, a receiving end may not only obtain the load information by using the OFDM symbols, but also obtain first information according to a phase deviation difference between two adjacent OFDM symbols used to transmit the load information, so as to cooperate with a transmitting end to implement that the load information and the first information are transmitted at the same time by using the OFDM symbols, thereby improving information transmission efficiency between the transmitting end and the receiving end, and improving transmission resource utilization between the transmitting end and the receiving end.

Figure 4:
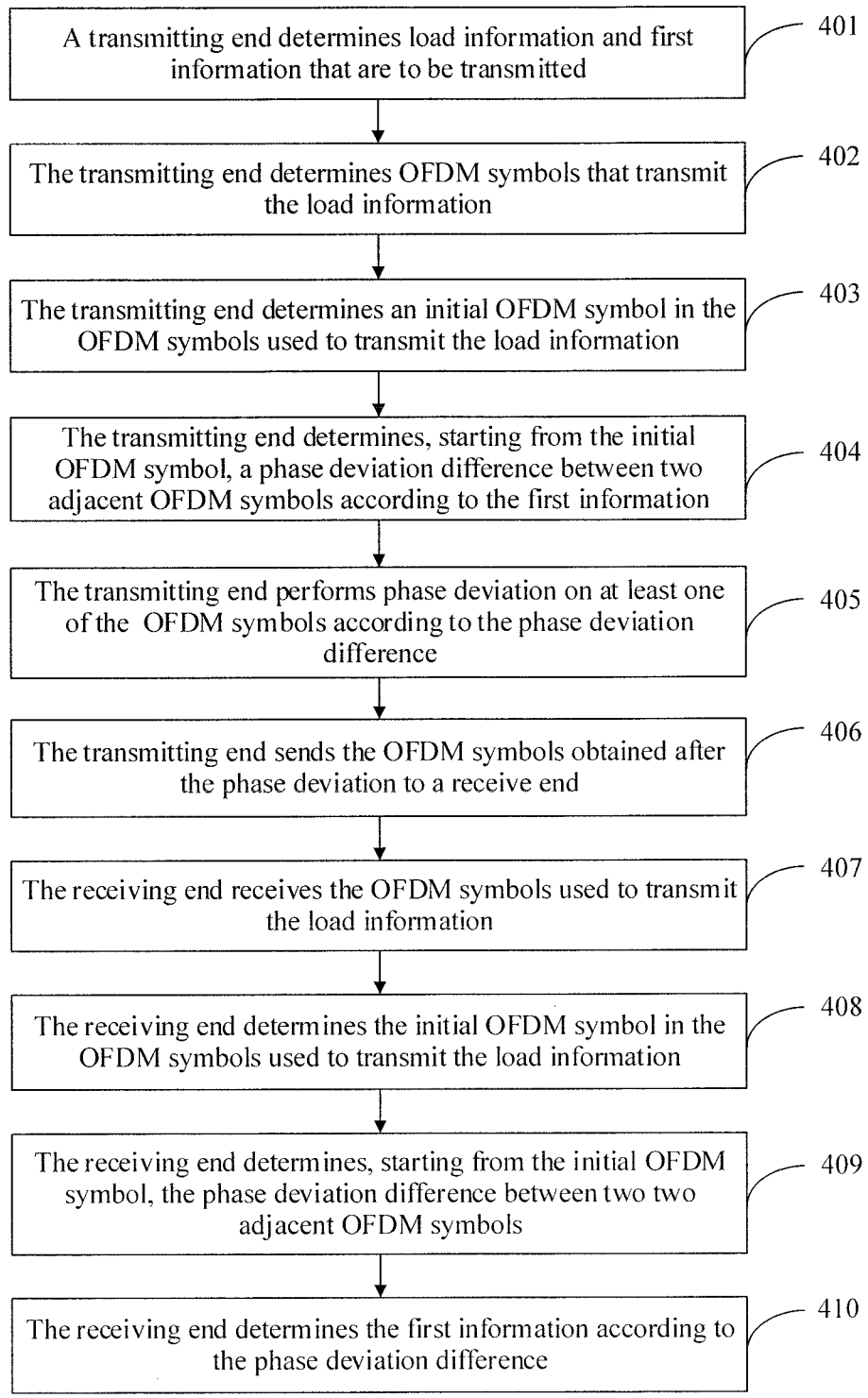
FIG. 4 is a flowchart of another information transmission method according to an embodiment of the present disclosure.

Referring to FIG. 4, FIG. 4 is a flowchart of another information transmission method according to an embodiment of the present disclosure, and the method includes:

Step 401: A transmitting end determines load information and first information that are to be transmitted.

Specifically how to determine, by the transmitting end, the load information and the first information that are to be transmitted is not described in detail herein in this application.

Step 402: The transmitting end determines OFDM symbols used to transmit the load information.

By performing modulation processing on the load information, the transmitting end may obtain the OFDM symbols used to transmit the load information, and specifically how to perform the modulation processing on the load information by the transmitting end is not described in detail herein in this application.

Step 403: The transmitting end determines an initial OFDM symbol in the OFDM symbols used to transmit the load information.

The initial OFDM symbol is the first OFDM symbol starting to be used to transmit the first information in the OFDM symbols of the load information.

The first OFDM symbol in the OFDM symbols used to transmit the load information may be used as the initial OFDM symbol, and the $N^{th}$ OFDM symbol may also be used as the initial OFDM symbol, which is not limited herein, where N is a natural number greater than 1.

Step 404: The transmitting end determines, starting from the initial OFDM symbol, a phase deviation difference between two adjacent OFDM symbols according to the first information.

The first information may be M-ary information, M is a natural number greater than 1, each bit of the first information corresponds to two different adjacent OFDM symbols, and a different value of each bit corresponds to a different reference difference; and the determining a phase deviation difference between two adjacent OFDM symbols according to the first information to be transmitted may include:

for each bit of the first information, determining, according to a value of the bit, a reference difference corresponding to the value as a phase deviation difference between two adjacent OFDM symbols that is corresponding to the bit.

A value of M may be: 2, 4, 8, 16, 32, or the like.

That the first information is binary information is used as an example. It is assumed that the first information includes eight bits and is 01101010. Starting from the first OFDM symbol that is used as the initial OFDM symbol, the first OFDM symbol to the ninth OFDM symbol may be OFDM symbols used to transmit the first information. The first bit "0" of the first information may correspond to a phase deviation difference between the first OFDM symbol and the second OFDM symbol, the second bit "1" of the first information may correspond to a phase deviation difference between the second OFDM symbol and the third OFDM symbol, and a phase deviation difference between two adjacent OFDM symbols that is corresponding to another bit of the first information is obtained by analogy. A value of each bit of the first information may be 0 or 1, where 0 may correspond to a first reference difference, and 1 may correspond to a second reference difference. Specific values of the first reference difference and the second reference difference are not limited in this application, but seen from a precision perspective, a larger difference between the two differences corresponds to higher precision. For example, the first reference difference may be positive 90 degrees and the second reference difference may be negative 90 degrees, or the first reference difference may be positive 45 degrees and the second reference difference may be negative 45 degrees, or the like.

Therefore, it may be determined that the phase deviation difference between the first OFDM symbol and the second OFDM symbol is the first reference difference according to the value "0" of the first bit of the first information, and it may be determined that the phase deviation difference between the second OFDM symbol and the third OFDM symbol is the second reference difference according to the value "1" of the second bit of the first information; by analogy, a phase deviation difference between each two adjacent OFDM symbols in the first OFDM symbol to the ninth OFDM symbol is obtained.

According to the foregoing example, specific implementation of this step when the first information is quaternary, octonary, hexadecimal, duotricenary information, or the like may further be adaptively obtained. A difference lies only in that, when the first information is quaternary, octonary, hexadecimal, or duotricenary information, each bit of the first information separately has four, eight, 16, or 32 possible values, and each value needs to correspond to a different reference difference.

For example, when the first information is quaternary information, each bit of the first information has four possible values, each value corresponds to a different reference difference, and totally four different reference differences need to be set. For example, the four different reference differences may be positive 90 degrees, positive 45 degrees, negative 45 degrees, and negative 90 degrees, or the like.

In addition, when the first information is transmitted at the same time by using the OFDM symbols used to transmit the load information, a relatively higher number system used by the first information may correspond to relatively higher quality of information transmission between the transmitting end and a receiving end when the first information is transmitted. Thus, when receiving the OFDM symbols of the load information, the receiving end can precisely determine a value corresponding to a phase deviation difference between two adjacent OFDM symbols, and further precisely determine the first information.

Step 405: The transmitting end performs phase deviation on at least one of the OFDM symbols according to the phase deviation difference.

This step may include:

obtaining, by the transmitting end, an initial phase deviation value of the initial OFDM symbol;

sequentially determining, by the transmitting end and starting from the initial OFDM symbol, a phase deviation value of each OFDM symbol according to the initial phase deviation value and the phase deviation difference between two adjacent OFDM symbols; and performing, by the transmitting end according to the determined phase deviation value of each OFDM symbol, phase deviation on the OFDM symbol.

A specific value of the initial phase deviation value of the initial OFDM symbol may be independently set in a practical application, which is not limited herein. The specific value of the initial phase deviation value may be pre-stored in the transmitting end, and when performing the step of obtaining an initial phase deviation value of the initial OFDM symbol, the transmitting end may directly obtain the pre-stored value from the transmitting end and use the pre-stored value as the initial phase deviation value.

For example, that the first information in step 404 is binary information is still used as an example. It is assumed that an initial phase deviation value of the initial OFDM symbol is zero degrees, a first reference difference is positive 90 degrees, and a second reference difference is negative 90 degrees. Therefore, it may be determined that a phase deviation value of the initial OFDM symbol (that is, the first OFDM symbol) is zero degrees. A phase deviation difference between the first OFDM symbol and the second OFDM symbol is positive 90 degrees, and therefore, it may be determined that a phase deviation value of the second OFDM symbol is negative 90 degrees. A phase deviation difference between the second OFDM symbol and the third OFDM symbol is negative 90 degrees, and therefore, it may be determined that a phase deviation value of the third OFDM symbol is zero degrees. By analogy, a phase deviation value of each OFDM symbol is determined, and phase deviation is performed on the OFDM symbol according to the phase deviation value of each OFDM symbol.

Step 406: The transmitting end sends the OFDM symbols obtained after the phase deviation to a receiving end.

That the transmitting end sends the OFDM symbols obtained after the phase deviation to a receiving end may include:

performing, by the transmitting end, inverse fast Fourier transformation (IFFT) processing on the OFDM symbols obtained after the phase deviation to convert the OFDM symbols into a time-domain signal, and sending the time-domain signal to the receiving end by using a preset channel.

Step 407: The receiving end receives the OFDM symbols used to transmit the load information.

That the receiving end receives the OFDM symbols used to transmit the load information may include:

receiving, by the receiving end and by using the preset channel, the time-domain signal used to transmit the load information, and sequentially performing fast Fourier transformation (FFT) processing and channel compensation processing on the time-domain signal to obtain the OFDM symbols used to transmit the load information.

Step 408: The receiving end determines the initial OFDM symbol in the OFDM symbols used to transmit the load information.

In step 408, the initial OFDM symbol determined by the receiving end is relevant to the initial OFDM symbol determined by the transmitting end in step 403. For example, when the transmitting end uses the first OFDM symbol in the OFDM symbols used to transmit the load information as the initial OFDM symbol in step 403, the receiving end may also use the first OFDM symbol in the OFDM symbols used to transmit the load information as the initial OFDM symbol in step 408. Alternatively or additionally, when the transmitting end uses the $N^{th}$ OFDM symbol as the initial OFDM symbol in step 403, the receiving end may also use the $N^{th}$ OFDM symbol in the OFDM symbols used to transmit the load information as the initial OFDM symbol in step 408.

Step 409: The receiving end determines, starting from the initial OFDM symbol, the phase deviation difference between two adjacent OFDM symbols.

This step may include:

determining, by the receiving end and starting from the initial OFDM symbol, the phase deviation value of each OFDM symbol; and calculating, by the receiving end, the phase deviation difference between two adjacent OFDM symbols.

Step 410: The receiving end determines the first information according to the phase deviation difference.

The first information may be M-ary information, each bit of the first information may separately correspond to two different adjacent OFDM symbols, and a different value of each bit corresponds to a different reference difference; and that the receiving end determines the first information according to the phase deviation difference may include:

for a phase deviation difference between each two adjacent OFDM symbols, determining, by the receiving end and according to a value relationship between the phase deviation difference and the reference difference, a value of a bit that is of the first information and corresponding to the phase deviation difference between two adjacent OFDM symbols.

When determining a value of a corresponding bit in the first information according to the value relationship between the phase deviation difference and the reference difference, the receiving end may determine a value corresponding to a reference difference to which the phase deviation difference is closest as the value of the corresponding bit in the first information.

In this step, a value of M is relevant to the value assigned to M when the transmitting end sends the first information.

That the first information is binary information, a first reference difference is positive 90 degrees, and a second reference difference is negative 90 degrees is still used as an example. If a phase deviation difference between two adjacent OFDM symbols is 88 degrees, the phase deviation difference is closest to the first reference difference, and a value of a corresponding bit in the first information is 0. If a phase deviation difference between two adjacent OFDM symbols is negative 93 degrees, the phase deviation difference is closest to the second reference difference, and a value of a corresponding bit in the first information is 1.

In this embodiment, besides transmitting load information by using OFDM symbols, a transmitting end further transmits first information according to a phase deviation difference between two adjacent OFDM symbols used to transmit the load information. After receiving the OFDM symbols used to transmit the load information, a receiving end may not only obtain the load information by using the OFDM symbols, but also obtain the first information according to the phase deviation difference between two adjacent OFDM symbols used to transmit the load information, so as to cooperate with the transmitting end to implement that the load information and the first information are transmitted at the same time by using the OFDM symbols, thereby improving information transmission efficiency between the transmitting end and the receiving end, and improving transmission resource utilization between the transmitting end and the receiving end.

The following describes an implementation principle of an information transmission method according to the present disclosure.

Because of a tiny difference between crystal oscillator clocks of a transmitting end and a receiving end, a carrier frequency offset is caused when an OFDM symbol is transmitted between the transmitting end and the receiving end. With an increase of time, the carrier frequency offset may cause a linear increase of a phase deviation of an OFDM symbol received by the receiving end, that is, signal rotation when reflected in a constellation diagram of the receiving end.

In a practical application, the carrier frequency offset may be separately estimated by using a preamble signal, and a phase deviation of each OFDM symbol is estimated by using a pilot signal in each OFDM symbol of load information, so that the phase deviation of each OFDM symbol is eliminated.

In an embodiment of the present disclosure, a phase deviation difference between two adjacent OFDM symbols used to transmit load information is used to transmit information, and even if the carrier frequency offset may cause an accumulation of a phase deviation between adjacent OFDM symbols, the carrier frequency offset imposes little impact on a phase deviation difference between two adjacent OFDM symbols. For example, a carrier frequency offset of 3 KHz causes a phase deviation accumulation of 30° in 10 OFDM symbols; however, a phase deviation difference error between two adjacent OFDM symbols is only 3°, and the phase deviation difference between two adjacent OFDM symbols does not increase as time goes by. Therefore, in a practical application, information can be transmitted in a relatively accurate manner by using a phase deviation difference between two adjacent OFDM symbols.

Figure 5:
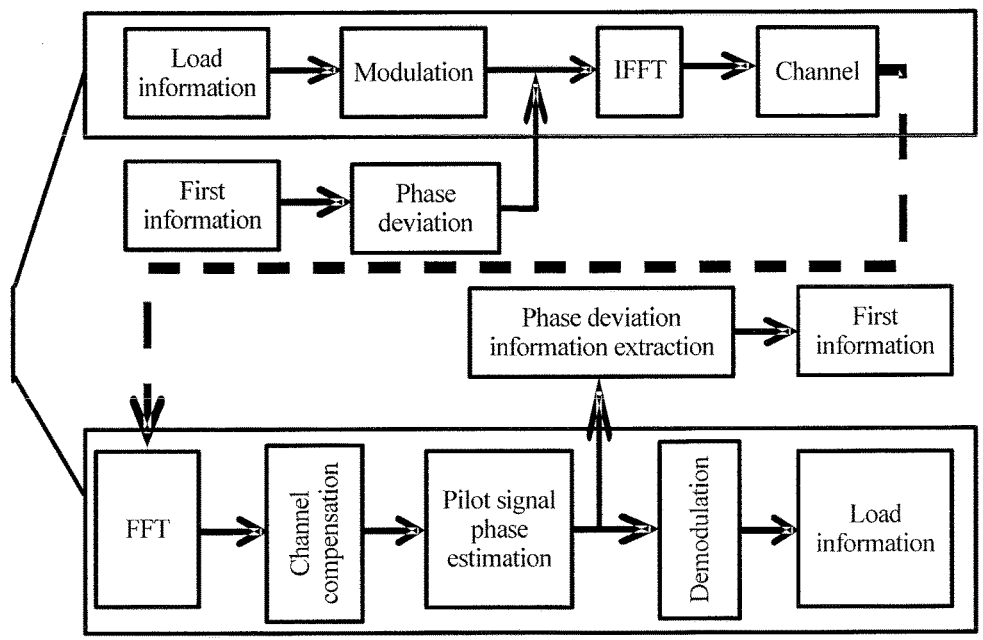
FIG. 5 is a diagram of a relationship between an information transmission method according to an embodiment of the present disclosure and a load information transmission method in the prior art.

In addition, the information transmission method according to the present disclosure and load information transmission in the prior art may be executed at the same time and are compatible. As shown in FIG. 5, a relationship between the load information transmission in the prior art and the information transmission method according to the embodiment of the present disclosure is as follows:

in the prior art, a transmitting end generally performs modulation processing on load information to obtain OFDM symbols used to transmit the load information, and after performing IFFT processing on the OFDM symbols used to transmit the load information to convert the OFDM symbols into a time-domain signal, sends the time-domain signal to a receiving end by using a preset channel; the receiving end receives, by using the preset channel, the time-domain signal used to transmit the load information, sequentially performs FFT processing and channel compensation processing to obtain the OFDM symbols used to transmit the load information, and then obtains the load information by demodulating the OFDM symbols;

in the information transmission method according to the embodiment of the present disclosure, based on a load information transmission process in the prior art, it is only needed that a transmitting end determines a phase deviation difference between two adjacent OFDM symbols according to first information and performs phase deviation on OFDM symbols of load information, and a receiving end determines the first information according to the OFDM symbols used to transmit load information.

In the embodiment of the present disclosure, although steps of determining a phase deviation difference between two adjacent OFDM symbols according to first information and performing phase deviation on OFDM symbols of load information are added to a transmitting end, when obtaining the load information by demodulating the OFDM symbols, a receiving end may estimate a phase deviation of an OFDM symbol according to a pilot signal of the OFDM symbol. Therefore, the phase deviation added by the transmitting end on the OFDM symbols used to transmit the load information imposes no impact on the process of obtaining, by the receiving end, the load information by demodulating the OFDM symbols.

In addition, in the embodiment of the present disclosure, the transmitting end only adds phase deviation on the OFDM symbols used to transmit the load information, a phase of a preamble signal remains unchanged. Because channel compensation processing and a carrier frequency offset estimation of a receiving end are completed in a preamble signal part, the phase deviation added on the OFDM symbols used to transmit the load information does not affect the channel compensation processing and the carrier frequency offset estimation that are performed by the receiving end. Therefore, the OFDM symbols used to transmit the load information may (theoretically) eliminate phase deviation resulted from the channel compensation processing and the carrier frequency offset estimation, so that transmission of the load information is not affected.

Figure 6:
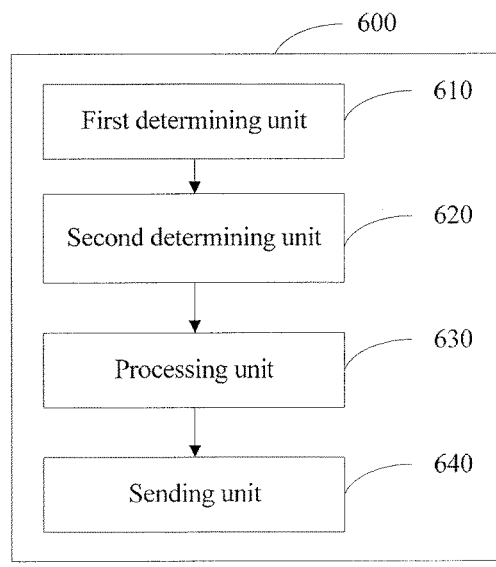
FIG. 6 is a structural diagram of an information transmission apparatus according to an embodiment of the present disclosure.

Corresponding to the method embodiment of the present disclosure, the present disclosure further provides an information transmission apparatus, where the apparatus may be disposed on a transmitting end. Referring to FIG. 6, the apparatus 600 includes:

a first determining unit 610, configured to determine an initial OFDM symbol in OFDM symbols used to transmit load information;

a second determining unit 620, configured to determine, starting from the initial OFDM symbol determined by the first determining unit 610, a phase deviation difference between two adjacent OFDM symbols according to first information to be transmitted;

a processing unit 630, configured to perform phase deviation on each OFDM symbol according to the phase deviation difference determined by the second determining unit 620; and a sending unit 640, configured to send, to a receiving end, the OFDM symbols obtained after the phase deviation performed by the processing unit 630.

Optionally, the first information is M-ary information, M is a natural number greater than 1, each bit of the first information corresponds to two different adjacent OFDM symbols, and a different value of each bit of the first information corresponds to a different reference difference; and the first determining unit 610 is specifically configured to:

for each bit of the first information, determining, according to a value of the bit, a reference difference corresponding to the value as a phase deviation difference between two adjacent OFDM symbols that is corresponding to the bit.

Optionally, a value of M may be one of the following: 2, 4, 8, 16, or 32.

Optionally, the processing unit 630 may include:

an obtaining subunit, configured to obtain an initial phase deviation value of the initial OFDM symbol;

a first determining subunit, configured to sequentially determine, starting from the initial OFDM symbol, a phase deviation value of each OFDM symbol according to the initial phase deviation value and the phase deviation difference between two adjacent OFDM symbols; and a processing subunit, configured to perform, according to the determined phase deviation value of each OFDM symbol, phase deviation on the OFDM symbol.

In this embodiment, besides transmitting load information by using OFDM symbols, a transmitting end further transmits first information according to a phase deviation difference between two adjacent OFDM symbols used to transmit the load information, so that the load information and the first information may be transmitted at the same time by using the OFDM symbols, thereby improving information transmission efficiency between the transmitting end and a receiving end, and improving transmission resource utilization between the transmitting end and the receiving end.

Figure 7:
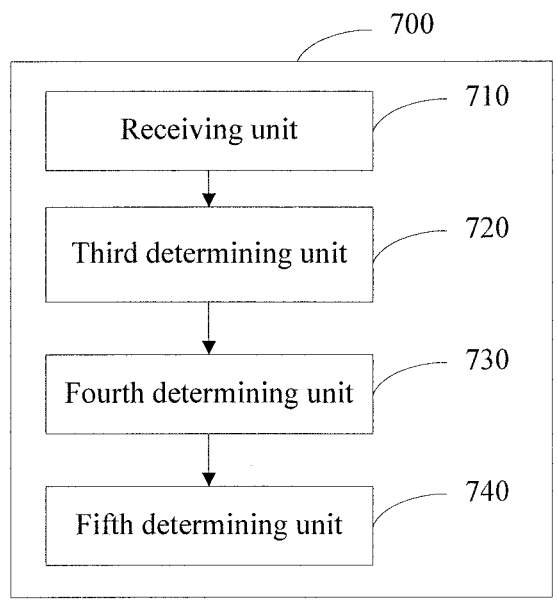
FIG. 7 is a structural diagram of another information transmission apparatus according to an embodiment of the present disclosure.

Referring to FIG. 7, FIG. 7 is a structural diagram of another information transmission apparatus according to an embodiment of the present disclosure, where the apparatus may be disposed on a receiving end. Referring to FIG. 7, the apparatus 700 may include:

a receiving unit 710, configured to receive OFDM symbols used to transmit load information;

a third determining unit 720, configured to determine an initial OFDM symbol in the OFDM symbols received by the receiving unit 710;

a fourth determining unit 730, configured to determine, starting from the initial OFDM symbol determined by the third determining unit 720, a phase deviation difference between two adjacent OFDM symbols; and a fifth determining unit 740, configured to determine first information according to the phase deviation difference determined by the fourth determining unit 730.

Optionally, the fourth determining unit 730 may include:

a second determining subunit, configured to determine, starting from the initial OFDM symbol, a phase deviation value of each OFDM symbol; and a calculating subunit, configured to calculate the phase deviation difference between two adjacent OFDM symbols.

Optionally, the first information is M-ary information, M is a natural number greater than 1, each bit of the first information corresponds to two different adjacent OFDM symbols, and a different value of each bit of the first information corresponds to a different reference difference; and the fifth determining unit 740 may be specifically configured to: for a phase deviation difference between each two adjacent OFDM symbols, determine, according to a value relationship between the phase deviation difference and the reference difference, a value of a bit that is of the first information and corresponding to the phase deviation difference between two adjacent OFDM symbols.

In this embodiment, after receiving OFDM symbols used to transmit load information, a receiving end may not only obtain the load information by using the OFDM symbols, but also obtain first information according to a phase deviation difference between two adjacent OFDM symbols used to transmit the load information, so as to cooperate with a transmitting end to implement that the load information and the first information are transmitted at the same time by using the OFDM symbols, thereby improving information transmission efficiency between the transmitting end and the receiving end, and improving transmission resource utilization between the transmitting end and the receiving end.

Figure 8:
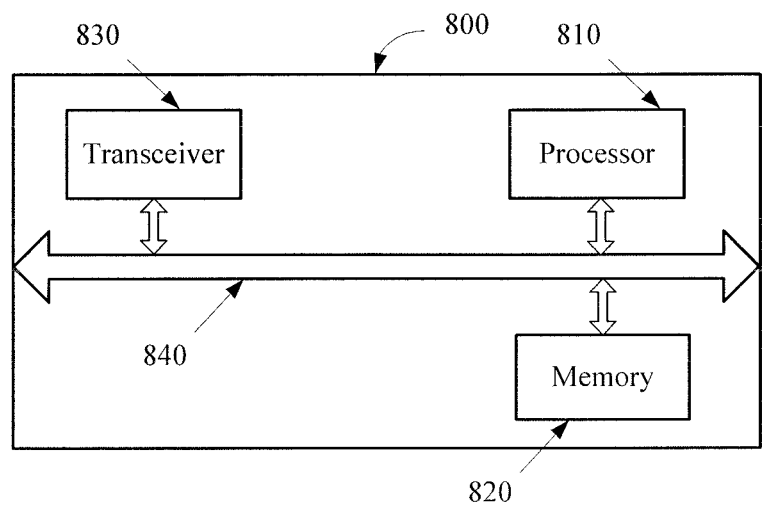
FIG. 8 is a structural diagram of a transmitting end according to an embodiment of the present disclosure.

Referring to FIG. 8, FIG. 8 is a schematic structural diagram of a transmitting end according to an embodiment of the present disclosure. The transmitting end 800 includes: a processor 810, a memory 820, a transceiver 830, and a bus 840.

The processor 810, the memory 820, and the transceiver 830 are connected to each other by using the bus 840, and the bus 840 may be an ISA bus, a PCI bus, an EISA bus, or the like. The bus may include an address bus, a data bus, a control bus, and the like. For ease of denotation, the bus is indicated by using only one thick line in FIG. 8; however, it does not indicate that there is only one bus or only one type of bus.

The memory 820 is configured to store a program. Specifically, the program may include program code, and the program code includes a computer operation instruction. The memory 820 may include a high-speed RAM memory, and may further include a non-volatile memory, such as at least one magnetic disk memory.

The processor 810 is configured to execute the program code to: determine an initial OFDM symbol in OFDM symbols used to transmit load information; determine, starting from the initial OFDM symbol, a phase deviation difference between two adjacent OFDM symbols according to first information to be transmitted; and perform phase deviation on each OFDM symbol according to the phase deviation difference.

The transceiver 830 is configured to connect to another device and communicate with the another device. The transceiver 830 is configured to send, to a receiving end, the OFDM symbols obtained after the phase deviation performed by the processor 810.

Optionally, the first information is M-ary information, M is a natural number greater than 1, each bit of the first information corresponds to two different adjacent OFDM symbols, and a different value of each bit of the first information corresponds to a different reference difference; and the processor 810 is specifically configured to: for each bit of the first information, determine, according to a value of the bit, a reference difference corresponding to the value as a phase deviation difference between two adjacent OFDM symbols that is corresponding to the bit.

Optionally, a value of M is: 2, 4, 8, 16, or 32.

Optionally, the processor 810 may be specifically configured to: obtain an initial phase deviation value of the initial OFDM symbol; sequentially determine, starting from the initial OFDM symbol, a phase deviation value of each OFDM symbol according to the initial phase deviation value and the phase deviation difference between two adjacent OFDM symbols; and perform, according to the determined phase deviation value of each OFDM symbol, phase deviation on the OFDM symbol.

In this embodiment, besides transmitting load information by using OFDM symbols, a transmitting end further transmits first information according to a phase deviation difference between two adjacent OFDM symbols used to transmit the load information, so that the load information and the first information may be transmitted at the same time by using the OFDM symbols, thereby improving information transmission efficiency between the transmitting end and a receiving end, and improving transmission resource utilization between the transmitting end and the receiving end.

Figure 9:
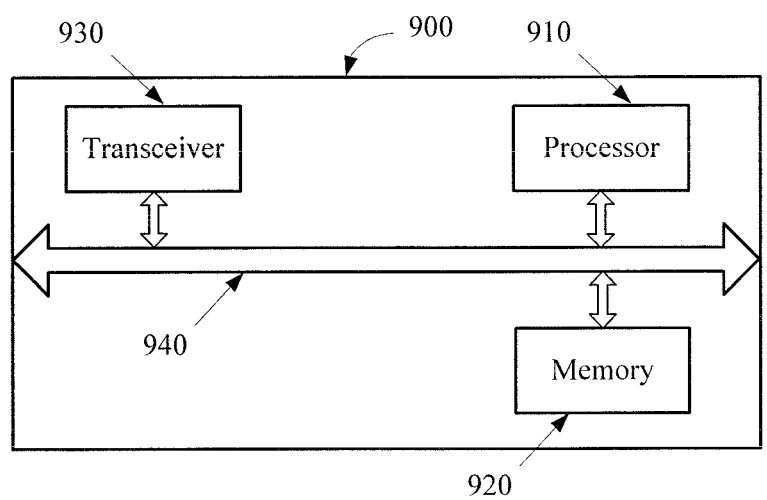
FIG. 9 is a structural diagram of a receiving end according to an embodiment of the present disclosure.

Referring to FIG. 9, FIG. 9 is a schematic structural diagram of a receiving end according to an embodiment of the present disclosure. The receiving end 900 includes: a processor 910, a memory 920, a transceiver 930, and a bus 940.

The processor 910, the memory 920, and the transceiver 930 are connected to each other by using the bus 940, and the bus 940 may be an ISA bus, a PCI bus, an EISA bus, or the like. The bus may include an address bus, a data bus, a control bus, and the like. For ease of denotation, the bus is indicated by using only one thick line in FIG. 9; however, it does not indicate that there is only one bus or only one type of bus.

The memory 920 is configured to store a program. Specifically, the program may include program code, and the program code includes a computer operation instruction. The memory 920 may include a high-speed RAM memory, and may further include a non-volatile memory, such as at least one magnetic disk memory.

The transceiver 930 is configured to connect to another device and communicate with the another device. The transceiver 930 is configured to receive OFDM symbols used to transmit load information.

The processor 910 is configured to execute the program code to: determine an initial OFDM symbol in the OFDM symbols received by the transceiver; determine, starting from the initial OFDM symbol, a phase deviation difference between two adjacent OFDM symbols; and determine first information according to the phase deviation difference.

Optionally, the processor 910 may be specifically configured to: determine, starting from the initial OFDM symbol, a phase deviation value of each OFDM symbol; and calculate the phase deviation difference between two adjacent OFDM symbols.

Optionally, the first information is M-ary information, M is a natural number greater than 1, each bit of the first information corresponds to two different adjacent OFDM symbols, and a different value of each bit of the first information corresponds to a different reference difference; and the processor 910 may be specifically configured to: for a phase deviation difference between each two adjacent OFDM symbols, determine, according to a value relationship between the phase deviation difference and the reference difference, a value of a bit that is of the first information and corresponding to the phase deviation difference between two adjacent OFDM symbols.

In this embodiment, after receiving OFDM symbols used to transmit load information, a receiving end may not only obtain the load information by using the OFDM symbols, but also obtain first information according to a phase deviation difference between two adjacent OFDM symbols used to transmit the load information, so as to cooperate with a transmitting end to implement that the load information and the first information are transmitted at the same time by using the OFDM symbols, thereby improving information transmission efficiency between the transmitting end and the receiving end, and improving transmission resource utilization between the transmitting end and the receiving end.

A person skilled in the art may clearly understand that, the technologies in the embodiments of the present disclosure may be implemented by software in addition to a hardware platform. Based on such an understanding, the technical solutions in the embodiments of the present disclosure essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present disclosure.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

The foregoing descriptions are implementation manners of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A method for transmitting information, comprising:
   determining an initial orthogonal frequency division multiplexing (OFDM) symbol in OFDM symbols that transmit load information;
   determining, starting from the initial OFDM symbol, a phase deviation difference between two adjacent OFDM symbols according to first information to be transmitted;
   performing phase deviation on at least one of the OFDM symbols according to the phase deviation difference; and sending the OFDM symbols obtained after the phase deviation to a receiving end.

2. The method according to claim 1, wherein the first information is M-ary information, M is a natural number greater than 1, each bit of the first information corresponds to two different adjacent OFDM symbols, and a different value of each bit of the first information corresponds to a different reference difference; and wherein determining a phase deviation difference between two adjacent OFDM symbols according to first information to be transmitted comprises:

for each bit of the first information, determining, according to a value of the bit, a reference difference corresponding to the value as a phase deviation difference between two adjacent OFDM symbols that is corresponding to the bit.

3. The method according to claim 2, wherein a value of M is one of: 2, 4, 8, 16, and 32.

4. The method according to claim 1, wherein performing phase deviation on at least one of the OFDM symbols according to the phase deviation difference comprises:

obtaining an initial phase deviation value of the initial OFDM symbol;

sequentially determining, starting from the initial OFDM symbol, a phase deviation value of each OFDM symbol according to the initial phase deviation value and the phase deviation difference between two adjacent OFDM symbols; and performing, according to the determined phase deviation value of each OFDM symbol, phase deviation on the OFDM symbol.

5. A method, comprising:

receiving orthogonal frequency division multiplexing (OFDM) symbols that transmit load information;

determining an initial OFDM symbol in the received OFDM symbols;

determining, starting from the initial OFDM symbol, a phase deviation difference between two adjacent OFDM symbols; and determining first information according to the phase deviation difference.

6. The method according to claim 5, wherein determining a phase deviation difference between two adjacent OFDM symbols comprises:

determining, starting from the initial OFDM symbol, a phase deviation value of each OFDM symbol; and calculating the phase deviation difference between two adjacent OFDM symbols.

7. The method according to claim 5, wherein the first information is M-ary information, M is a natural number greater than 1, each bit of the first information corresponds to two different adjacent OFDM symbols, and a different value of each bit of the first information corresponds to a different reference difference; and the determining first information according to the phase deviation difference comprises:

for a phase deviation difference between each two adjacent OFDM symbols, determining, according to a value relationship between the phase deviation difference and the reference difference, a value of a bit that is of the first information and corresponding to the phase deviation difference between two adjacent OFDM symbols.

8. A transmitting end, comprising a processor and a transceiver, wherein the processor is configured to: determine an initial orthogonal frequency division multiplexing (OFDM) symbol in OFDM symbols used to transmit load information; determine, starting from the initial OFDM symbol, a phase deviation difference between two adjacent OFDM symbols according to first information to be transmitted; and perform phase deviation on at least one of the OFDM symbols according to the phase deviation difference; and the transceiver is configured to send, to a receiving end, the OFDM symbols obtained after the phase deviation performed by the processor.

9. The transmitting end according to claim 8, wherein the first information is M-ary information, M is a natural number greater than 1, each bit of the first information corresponds to two different adjacent OFDM symbols, and a different value of each bit of the first information corresponds to a different reference difference; and the processor is specifically configured to: for each bit of the first information, determine, according to a value of the bit, a reference difference corresponding to the value as a phase deviation difference between two adjacent OFDM symbols that is corresponding to the bit.

10. The transmitting end according to claim 9, wherein a value of M is one of: 2, 4, 8, 16, and 32.

11. The transmitting end according to claim 8, wherein the processor is further configured to: obtain an initial phase deviation value of the initial OFDM symbol; sequentially determine, starting from the initial OFDM symbol, a phase deviation value of each OFDM symbol according to the initial phase deviation value and the phase deviation difference between two adjacent OFDM symbols; and perform, according to the determined phase deviation value of each OFDM symbol, phase deviation on the OFDM symbol.

12. A receiving end, comprising a transceiver and a processor, wherein the transceiver is configured to receive OFDM symbols used to transmit load information; and the processor is configured to: determine an initial OFDM symbol in the OFDM symbols received by the transceiver; determine, starting from the initial OFDM symbol, a phase deviation difference between two adjacent OFDM symbols; and determine first information according to the phase deviation difference.

13. The receiving end according to claim 12, wherein the processor is further configured to: determine, starting from the initial OFDM symbol, a phase deviation value of each OFDM symbol; and calculate the phase deviation difference between two adjacent OFDM symbols.

14. The receiving end according to claim 12, wherein the first information is M-ary information, M is a natural number greater than 1, each bit of the first information corresponds to two different adjacent OFDM symbols, and a different value of each bit of the first information corresponds to a different reference difference.

15. The receiving end according to claim 14, wherein the processor is configured to: for a phase deviation difference between each two adjacent OFDM symbols, determine, according to a value relationship between the phase deviation difference and the reference difference, a value of a bit that is of the first information and corresponding to the phase deviation difference between two adjacent OFDM symbols.

* * * * *